United States Patent [19]
Hansen

[11] 3,823,560
[45] July 16, 1974

[54] METHOD AND APPARATUS FOR OBTAINING ENERGY FROM TEMPERATURE CHANGES

[75] Inventor: Ralph H. Hansen, Short Hills, N.J.

[73] Assignee: J. P. Stevens & Co., Inc., New York, N.Y.

[22] Filed: Aug. 7, 1969

[21] Appl. No.: 848,276

[52] U.S. Cl. .................................... 60/527, 60/531
[51] Int. Cl. ............................................ F03g 7/06
[58] Field of Search ............. 73/295, 368.2; 251/11; 137/79; 236/99, 100; 60/527, 528, 530, 531

[56] References Cited

UNITED STATES PATENTS 1,159,893 11/1915 Browne et al. .......................... 60/23

*Primary Examiner*—Edgar W. Geoghegan
*Assistant Examiner*—Allen M. Ostrager
*Attorney, Agent, or Firm*—Charles A. Stein; Michael T. Frimer

[57] ABSTRACT

This invention relates to the conversion of temperature changes into energy. In the present invention, there is confined within a sealed chamber a temperature responsive composition comprising a gas and a solvent, which in the liquid state, dissolves a greater amount of the gas than when said solvent is in the solid state. The amount of gas in said composition is greater than the amount of gas which can be dissolved by the solvent in the chamber when said solvent is in the solid state. Converting the solvent from a liquid to a solid, thus results in the expulsion of gas from the solvent, thereby increasing the pressure within said chamber, while converting the solvent from a solid to a liquid results in gas being dissolved by the solvent, causing a decrease in the pressure within said chamber. Useful energy is obtained from these pressure changes. Preferably, there is associated with said chamber at least one element which is either physically moved or which generates an electric current in response to pressure changes within said chamber. Such physical movements or electric currents can be used for many purposes, such as the control of temperature sensitive switches and valves.

6 Claims, 6 Drawing Figures

INVENTOR.
RALPH H. HANSEN
BY Charles A. Stein
ATTORNEY

INVENTOR.
RALPH H. HANSEN
BY Charles A. Stein
ATTORNEY

METHOD AND APPARATUS FOR OBTAINING ENERGY FROM TEMPERATURE CHANGES

In accordance with the present invention, temperature changes are converted to useful energy through the use of a temperature responsive composition comprising a gas and a solvent which in the liquid state dissolves more of said gas than when the solvent is in the solid state. The amount of gas present is greater than the amount of gas which can be dissolved by the solvent when it is in the solid state. The composition is confined within a sealed chamber and thus, when the solvent is changed from a liquid to a solid, a quantity of gas is expelled from the solvent, increasing the pressure within the chamber. Conversely, when the solvent is reconverted to a liquid, a quantity of gas is redissolved in the solvent, decreasing the pressure. The energy potential obtainable from the present invention is far greater than that obtainable from simple thermal expansion. Since the changes in the temperature responsive composition are reversible, the composition can be employed as a repetitive source of energy.

Associated with the sealed chamber is one or more elements responsive to pressure changes within the chamber. Preferably, such element or elements are either physically moved or actuated to generate an electric current. Thus, for instance, physical movement or physical work can be obtained by: (1) providing the chamber with a piston which is forced outward when the pressure within the chamber is increased and moves inward when the pressure is decreased, (2) constructing all, or part of the chamber of an elastomeric material, which is forced outward by increased pressure within the chamber, (3) constructing the chamber in the form of a bellows which expands and contracts in response to changes in internal pressure, and (4) constructing at least a portion of the chamber in a curved or zigzag shape, which in the manner of a Bourdon tube, assumes a straighter configuration when the pressure within the chamber is increased. An electric current can be generated by providing the chamber with a piezoelectric device.

Where an element is physically moved, it can be used for a wide variety of applications in which moving parts are employed to provide actuation or power, such uses being obvious to those skilled in the art. Examples include: (1) actuation of switches which control apparatus to be run at a predetermined temperature or any other device to be actuated at a predetermined temperature, (2) opening and closing of valves such as safety valves, valves in a sprinkler system, and valves in an automobile choke, and (3) to act as a power source in an engine.

Where an electric current is generated by a piezoelectric device, this current can be used to control a variety of devices which are to be actuated at a predetermined temperature and can also be used as a power source.

A two-point temperature actuation can be obtained from a single system by taking advantage of the boiling point of the solvent. Thus, if a solvent system is selected which boils within the temperature range of usage, heating the solvent to bring it from solid, to liquid, to gas gives the following sharp pressure changes: (1) a decrease in pressure when the solvent melts, and (2) an increase in pressure when the solvent boils.

By using a number of different solvent systems having different melting and boiling points, and placing these systems in separate chambers, an apparatus having a number of activation points can be obtained.

The invention will be more readily understood when the following detailed description is read in conjunction with the accompanying drawings. The drawings illustrate six forms of the invention, it being apparent from the present description that many other forms can be constructed by a person skilled in the art which fall within the scope of this invention.

Figure 5:
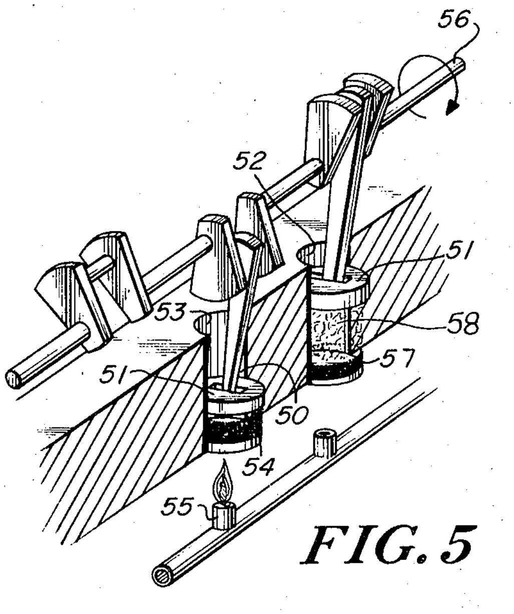
Figure 6:
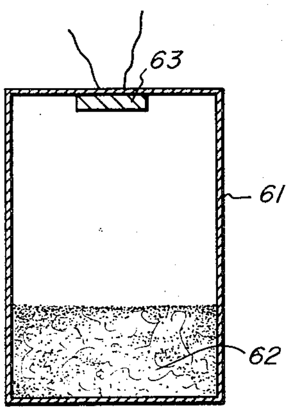

FIG. 5 is a perspective view of an embodiment of the present invention in which a cyclic pressure change obtained by alternately applying heat to the temperature responsive composition serves as the power source for a piston engine; and FIG. 6 is a perspective view of an embodiment of the present invention in which the chamber containing the temperature responsive composition is equipped with a piezoelectric device which generates electric current in response to pressure changes within the chamber.

Figure 1:
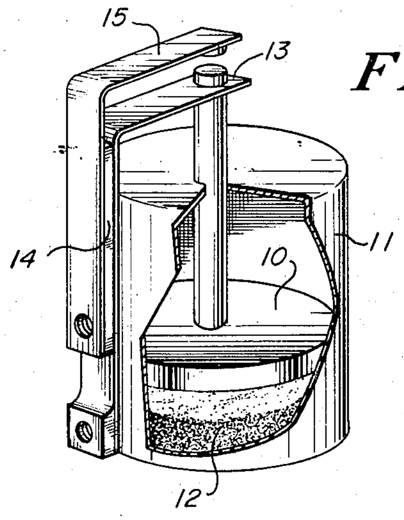
FIG. 1 is a perspective view of an embodiment of the present invention in which a piston is moved by pressure changes created by the temperature responsive composition and movement of the piston opens and closes an electric switch.

Referring now to FIG. 1, there is shown a piston 10 slidingly mounted in a cylinder 11. The bottom of the piston, along with the walls and bottom of the cylinder, define a sealed chamber in which there is confined a solution 12 of a gas in a liquid solvent, which dissolves more of the gas in the liquid state than when converted to a solid. More gas is present in the sealed chamber than can be dissolved by the solvent when converted to a solid.

The top of the piston is pressed down by a spring metal element 13 of an electric switch 14. When the solvent is frozen, gas is expelled therefrom and the resulting pressure forces the piston upward so that the spring element 13 is pressed against contact 15 to close the switch. As the solvent is subsequently melted, the gas redissolves, the upward pressure on the piston decreases, and the spring element 13 presses the piston downward. It is apparent that the apparatus of FIG. 1 can be modified so that movement of the piston can control a valve or activate other useful devices.

Figure 2:
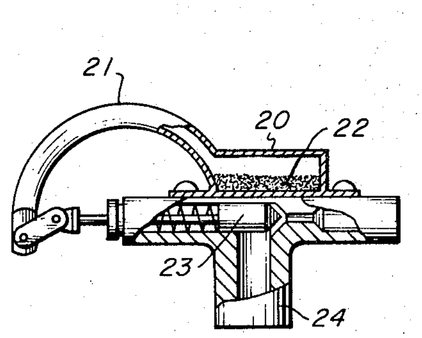
FIG. 2 is a perspective view of an embodiment of the present invention in which part of the chamber containing the temperature responsive composition is in the shape of a Bourdon tube. As the pressure within the chamber increases, the part of the chamber shaped like a Bourdon tube straightens, controlling a valve associated therewith.

In FIG. 2, there is shown another embodiment illustrative of the present invention. This embodiment has a sealed hollow tube 20, including a section 21 which is shaped and constructed to function as a Bourdon tube. The chamber 20 contains a solution 22 similar to solution 12 of FIG. 1. Attached to the end of section 21 is an element 23, which is slidingly mounted to control the opening in the valve 24. When the solvent is frozen, gas is expelled, increasing the pressure within the chamber 20. This causes section 21 to straighten moving the element 23 and opening the valve 24. When the solvent is melted, the pressure in the chamber 20 drops, element 21 goes back to its original shape, and the valve 24 is again closed. As with the embodiment of FIG. 1, the moving element can be used to actuate many other devices.

Figure 3:
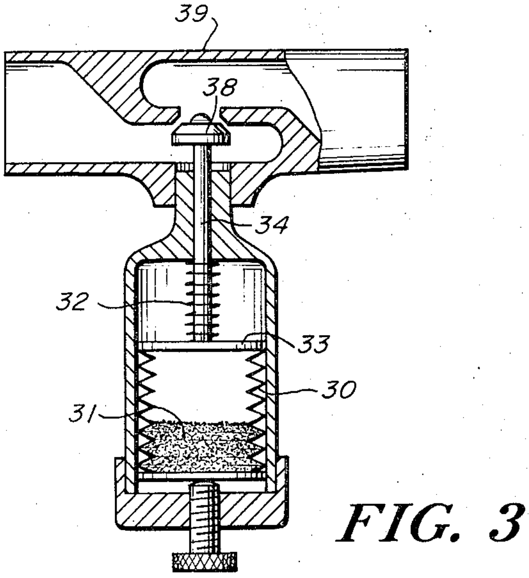
FIG. 3 is a perspective view of an embodiment of the present invention in which the chamber containing the temperature responsive composition is in the form of a bellows which expands and contracts in response to internal pressure changes and this expansion and contraction is used to control a valve.

FIG. 3 shows another embodiment of the present invention. This embodiment has a sealed bellows-type chamber 30 containing a solution 31 similar to solution 12 of FIG. 1. The bellows-type chamber is held in an unexpanded position by spring 32 which is positioned on rod 34. Rod 34 is attached to the chamber top piece 33. The other end of rod 34 is attached to element 38, which controls the opening of valve 39. When the solvent of solution 31 is frozen, gas is expelled and the pressure in chamber 30 is increased forcing chamber top 33 outward, while being guided by rod 34. This movement causes element 38 to close valve 39. This procedure reverses when the solvent is melted. The movement of rod 34 can, of course, be adapted to carry out other useful work.

Figure 4:
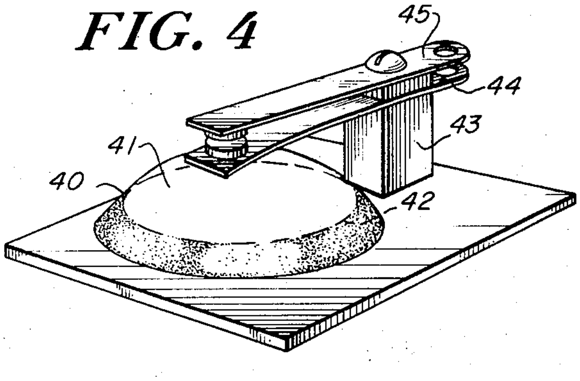
FIG. 4 is a perspective view of an embodiment of the present invention in which the chamber containing the temperature responsive composition has a top portion of an elastomeric material which is forced upward by increased pressure within the chamber to close a microswitch.

FIG. 4 illustrates another embodiment of the present invention. This embodiment has a sealed chamber 40, including a portion 41 constructed from an elastomeric material. The chamber 40 contains a solution 42 similar to solution 12 of FIG. 1. Located adjacent the elastomeric portion 41 is a switch 43 having a spring metal element 44 resting against elastomeric portion 41. When the solvent of solution 42 freezes, gas is expelled, forcing elastomeric section 41 outward and pressing spring element 44 against contact 45, thus closing the electric switch.

FIG. 5 shows still another embodiment of the present invention. In this embodiment, changes in pressure created by the temperature responsive composition act as a power source for a piston engine. Sealed chambers 50 are defined by the bottom of pistons 51 and the walls and bottom of cylinders 52 and 53. Within the chambers there is contained a composition which comprises a gas and a solvent, which in the liquid state dissolves a greater amount of said gas than when said solvent is in the solid state. More gas is present than the solvent can dissolve when it is in the solid state and the solvent of the composition is a high melting, normally solid material. The solvent is cyclically converted from a solid to a liquid by firing the burners 55. When the burners are on, solution 54 of the gas in liquid solvent is formed, a low pressure exists in the sealed chamber and the piston is in the position shown in cylinder 53. When the burners go off, the solvent freezes to a solid 57, gas 58 is expelled and the pistons are driven up to the position shown in cylinder 52. The up and down motion of the pistons drives crankshaft 56 in the conventional manner.

FIG. 6 shows another embodiment of the present invention. This embodiment has a sealed chamber 61 containing a solution 62 similar to solution 12 of FIG. 1. The chamber 61 is provided with a piezoelectric device 63. When the solvent of solution 62 freezes, gas is expelled increasing the pressure within the chamber, thereby activating piezoelectric device 63.

As previously stated, a requirement of the solvent-gas system is that the solvent material dissolves more of the gas when in a liquid state than in the solid state so that upon solidifying the solvent by freezing, the gas is expelled from the solution. This type of solubility behavior is possessed by most solvents and mixtures of solvents, and can be readily determined by one skilled in the art. In particular, solvents which form crystalline solids on freezing, generally dissolve substantially more gas in the liquid state than in the solid state.

The primary activation temperature of the present invention is the temperature at which the solvent is converted from a liquid to a solid or vice versa. The desired activation temperature depends upon the particular usage for which the present invention is employed. Thus, in those cases where the present invention is used to operate temperature activated controls, the solvent material employed must either solidify or melt at the temperature at which activation is desired. In selecting a solvent-gas system, it is to be noted that in general, as the gas is dissolved, the freezing point of the liquid is gradually lowered. The freezing point of any given system can, of course, be readily determined. As previously stated, a secondary activation point can be obtained at the temperature at which the solvent boils in a given system.

Illustrative of some gases suitable for use in the present invention are: ammonia, nitrous oxide, carbon dioxide, trifluoromethane, monochlorodifluoromethane, dichlorodifluoromethane, monochloropentafluoroethane, dimethyl ether, cyclopropane and nitrogen.

Illustrative of some of the solvents suitable for use in the present invention are: acetophenone, tert-butyl alcohol, n-octadecane, dimethyl adipate, 1,2-dibromoethane, phenyl ether, urethane, water, dimethylsulfoxide, n-propyl sulfone, triocosane, n-docosane, piperonal, formamide, 1-hexadecanol, levulinic acid, eicosane, polyethylene glycol and diphenyl methane. Mixtures of solvents may also be employed, if desired.

Specific temperature responsive compositions which have been determined to give a considerable increase in pressure on freezing of the solvent are listed below; all of these compositions being readily used in the practice of the present invention. Where measured, along with the composition there is given a typical volume of gas expelled on freezing of the solvent, the composition being saturated solutions prepared at one atmosphere pressure:

| Solvent | Gas | Volume (cc) of gas Expelled per cc of Solvent |
|---|---|---|
| Acetophenone | Monochlorodifluoromethane | 44 |
| Acetophenone | Dimethyl Ether | 44 |
| Acetophenone | Cyclopropane | — |
| Acetophenone | Ammonia | 8 |
| Acetophenone | Carbon Dioxide | — |
| Acetophenone | Nitrous Oxide | 23 |
| Acetophenone | Dichlorodifluoromethane | 25 |
| Acetophenone | Trifluoromethane | 6 |
| Acetophenone | Monochloropentafluoroethane | — |
| Tert-butyl Alcohol | Monochlorodifluoromethane | 3 |
| Tert-butyl Alcohol | Dimethyl Ether | 6 |
| Tert-butyl Alcohol | Cyclopropane | 17 |
| Tert-butyl Alcohol | Carbon Dioxide | — |

-Continued

| Solvent | Gas | Volume (cc) of gas Expelled per cc of Solvent |
|---|---|---|
| Tert-butyl Alcohol | Monochloropentafluoroethane | 3 |
| n-Octadecane | Monochlorodifluoromethane | — |
| n-Octadecane | Dimethyl Ether | — |
| n-Octadecane | Cyclopropane | 34 |
| n-Octadecane | Carbon Dioxide | — |
| Dimethyl Adipate | Monochlorodifluoromethane | — |
| Dimethyl Adipate | Dimethyl Ether | — |
| Dimethyl Adipate | Cyclopropane | 5.3 |
| Dimethyl Adipate | Carbon Dioxide | — |
| Levulinic Acid | Monochlorodifluoromethane | 5.2 |
| 1,2-Dibromoethane | Monochlorodifluoromethane | 7 |
| 1,2-Dibromoethane | Dimethyl Ether | — |
| 1,2-Dibromoethane | Cyclopropane | 16 |
| 1,2-Dibromoethane | Carbon Dioxide | — |
| Phenyl Ether | Monochlorodifluoromethane | — |
| Phenyl Ether | Dimethyl Ether | — |
| Urethane (Ethyl Carbamate) | Monochlorodifluoromethane | 6.5 |
| Urethane | Dimethyl Ether | 17.3 |
| Urethane | Cyclopropane | 6.1 |
| Urethane | Carbon Dioxide | 2 |
| Urethane | Nitrous Oxide | 0.5 |
| Urethane | Dichlorodifluoromethane | 2.1 |
| Urethane | Nitrogen | — |
| Water | Carbon Dioxide | 4 |
| Dimethylsulfoxide | Monochlorodifluoromethane | 1.5 |
| Dimethylsulfoxide | Cyclopropane | 5 |
| n-Propylsulfone | Monochlorodifluoromethane | 4.8 |
| n-Propylsulfone | Cyclopropane | — |
| Tricosane | Monochlorodifluoromethane | 1.2 |
| n-Docosane | Monochlorodifluoromethane | 0.8 |
| Formamide | Monochlorodifluoromethane | 2.2 |
| Formamide | Dimethyl Ether | 1 |
| Formamide | Cyclopropane | 1 |
| 1-Hexadecanol | Monochlorodifluoromethane | 2.6 |
| Eicosane | Monochlorodifluoromethane | 2.0 |
| Polyethylene Glycol | Monochlorodifluoromethane | 6.2 |
| Diphenyl Methane | Monochlorodifluoromethane | 9 |
| Diphenyl Methane | Cyclopropane | 15 |
| Piperonal | Monochlorodifluoromethane | 7.5 |
| Piperonal | Dimethyl Ether | 13.5 |
| Piperonal | Cyclopropane | 4.4 |
| Piperonal | Carbon Dioxide | 2.2 |
| Piperonal | Nitrous Oxide | 1 |

It will be apparent that many modifications and variations can be effected without departing from the scope of the novel concepts of the present invention, and the illustrative details disclosed are not to be construed as imposing undue limitations on the invention.

I claim:

1. A process for obtaining a physical force from a temperature change comprising 1. confining a temperature responsive composition within a chamber of a device having at least one movable member which moves in response to pressure changes in the chamber, said composition comprising a gas and a solvent which in the liquid state dissolves a greater amount of said gas than when said solvent is in the solid state, the amount of gas in said composition being greater than the amount of gas which can be dissolved by the solvent in the chamber when said solvent is in the solid state, and
2. changing the temperature of the chamber so as to convert the solvent from either a liquid to a solid by freezing or from a solid to a liquid by melting whereby the pressure within the chamber is changed and at least one movable member of said device is actuated.

2. A process as claimed in claim 1 wherein said movable member is a piston.

3. A process as claimed in claim 1 wherein movement of said movable member actuates a switch.

4. A process as claimed in claim 1 wherein movement of said movable member regulates the opening in a valve.

5. A process for obtaining a physical force from a temperature change comprising 1. confining a temperature responsive composition within a sealed chamber, at least a portion of said chamber having a curved or zigzag shape which assumes a straighter configuration when the internal pressure of the chamber is increased, said composition comprising a gas and a solvent which in the liquid state dissolves a greater amount of said gas than when said solvent is in the solid state, the amount of gas in said composition being greater than the amount of gas which can be dissolved by the solvent in the chamber when said solvent is in the solid state, and
2. changing the temperature of the chamber so as to convert the solvent from either a liquid to a solid by freezing or from a solid to a liquid by melting whereby the pressure within the chamber is changed and the configuration of said curved or zigzag portion of said chamber is changed.

6. A process for obtaining a physical force from a temperature change comprising 1. confining a temperature responsive composition within a chamber which expands when its internal pressure is increased and contracts when its internal pressure is decreased, said chamber being associated with a device which is actuated by expansion and contraction of the chamber and said composition comprising a gas and a solvent which in the liquid state dissolves a greater amount of said gas than when said solvent is in the solid state, the amount of gas in said composition being greater than the amount of gas which can be dissolved by the solvent in the chamber when said solvent is in the solid state, and
2. changing the temperature of the chamber so as to convert the solvent from either a liquid to a solid by freezing or from a solid to a liquid by melting whereby the pressure within the chamber is changed and the size of said chamber changes.

* * * * *